March 29, 1966 J. LYMAN 3,243,238

MAGNETIC SUSPENSION

Filed July 20, 1962 4 Sheets-Sheet 1

INVENTOR.
JOSEPH LYMAN

BY Paul B Hunter

ATTORNEY

March 29, 1966 J. LYMAN 3,243,238

MAGNETIC SUSPENSION

Filed July 20, 1962 4 Sheets-Sheet 2

*INVENTOR.*
JOSEPH LYMAN

BY *Paul B Hunter*

ATTORNEY

March 29, 1966 J. LYMAN 3,243,238

MAGNETIC SUSPENSION

Filed July 20, 1962 4 Sheets-Sheet 3

INVENTOR.
JOSEPH LYMAN
BY
Paul B Hunter
ATTORNEY

INVENTOR.
JOSEPH LYMAN
BY Paul B Hunter
ATTORNEY

United States Patent Office
3,243,238
Patented Mar. 29, 1966

3,243,238
MAGNETIC SUSPENSION
Joseph Lyman, 121 Norwood Ave., Northport, N.Y.
Filed July 20, 1962, Ser. No. 211,541
3 Claims. (Cl. 308—10)

This invention relates to systems for suspending an object by magnetic forces and, more particularly, to a new and improved magnetic suspension system which is effective to provide free suspension in every orientation and under substantial forces tending to displace the object.

Heretofore, the systems which have been devised for suspending objects magnetically have been capable only of counteracting gravity and, accordingly, they have been effective to generate a suspending force in one direction only. In the United States patent to Peer, No. 2,377,175, for example, a display stand is suspending over an alternating magnetic field by the repulsive force resulting from induced eddy currents in a disc of conductive non-magnetic material. On the other hand, in the various United States patents to Beams, such as Patent No. 2,733,857, for example, a centrifuge in suspended below an electromagnet by the attractive magnetic force acting between the magnet and a mass of magnetic material attached to the centrifuge.

In both of these patents, however, the suspending force acts on the suspended device in one dimension only so that if the apparatus were inverted or even tilted appreciably, with respect to its normal orientation, the system would no longer be effective to provide free suspension of the device. Consequently, such systems are completely incapable of providing free suspension of objects such as gyroscope rotors which may assume any orientation with respect to the vertical and, moreover, they are ineffective to maintain free suspension if substantial displacing forces are applied to the suspended object.

Accordingly, it is an object of the present invention to provide a new and improved magnetic suspension system which overcomes the above-mentioned disadvantages of the prior art.

Another object of the invention is to provide a magnetic suspension system which is effective to provide free suspension in every orientation of the system.

A further object of the invention is to provide a magnetic suspension system which maintains free suspension despite substantial forces applied in more than one dimension tending to displace the suspended object.

An additional object of the invention is to provide a freely suspended gyroscope device for use in apparatus subjected to high accelerative forces.

These and other objects of the invention are attained by providing a member which is responsive to magnetic forces, along with opposed magnetic means disposed adjacent to the member so as to cooperate therewith to generate magnetic forces acting in opposite directions on the member in at least two dimensions, which forces tend to restore the member to a selected location with respect to at least two dimensions and which forces increase sharply with increasing displacement of the member away from that location in either dimension. In one embodiment of the invention, the member includes magnet means having polarities opposite to the adjacent polarities of the opposed magnet means, and the latter are arranged to generate restoring forces in at least two dimensions. Other embodiments utilize opposed electromagnet means which are energized in accordance with the location of the member and, in one case, repulsive forces are generated by the action of the electromagnet fields on conductive nonmagnetic elements affixed to the suspended member, while, in another arrangement, the member includes magnetic portions and balanced attractive forces are produced by the electromagnet means.

Further objects and advantages of the invention will be apparent from a reading of the following description in conjunction with the accompanying drawings, in which.

In order to suspend a member freely by the use of magnetic forces, it is necessary to provide an arrangement of magnetic elements which act on the member in opposed directions so that the member normally assumes a stable position. Moreover, if the member is to be subjected to large forces tending to displace it from the selected position, the restoring forces produced by the magnetic elements must increase sharply as the member is displaced in any direction from its normal location; otherwise such forces will cause the member to escape the restoring fields of the magnetic elements. On the other hand, with sharply increasing opposed forces of this type, the member may be subject to severe oscillation or hunting, and care must be exercised in controlling the strength and shape of the fields generated by the magnetic elements to avoid this.

Figure 1:
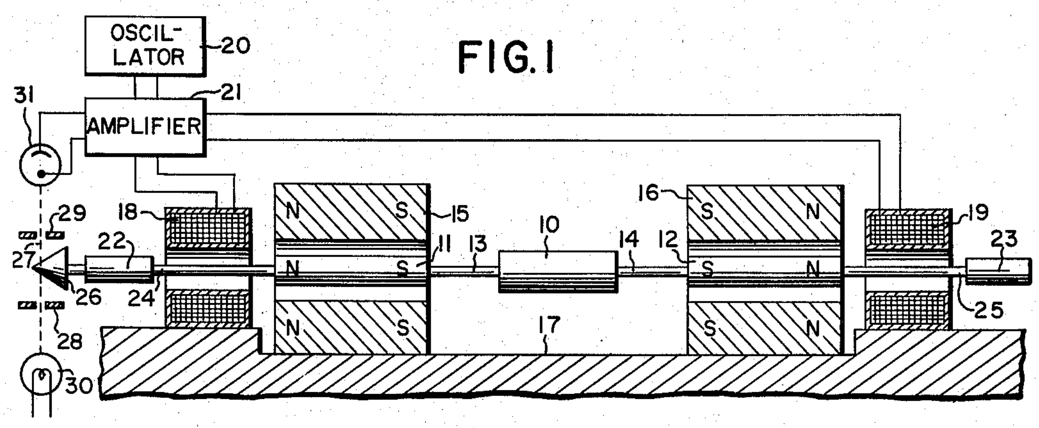
FIG. 1 is a view in longitudinal section, partly schematic, illustrating one form of magnetic suspension system arranged according to the invention.

In the representative embodiment of the invention shown in FIG. 1, free magnetic suspension of the member 10 in all angular orientations is obtained by rigidly affixing two axially aligned permanent magnets or magnet elements 11 and 12 to the member on opposite sides thereof, preferably along an axis of symmetry of the member, As used hereinafter, the term "axial" refers to the dimension extending to the left and right of the suspended member as viewed in the drawings, whereas the term "lateral" describes the dimensions extending perpendicularly thereto. These magnets, which may be made of Alnico IV, Indox or the like, can be mounted directly on the object or, as illustrated in FIG. 1, attached thereto by rigid connecting members 13 and 14 which are preferably made of a light nonmagnetic substance such as wood, aluminum, or a plastic material.

Where relative rotation or other relatively rapid motion of the suspended member with respect to the suspending magnets is contemplated, each of the suspending elements which is subjected to a magnetic field should be made of an electrically nonconductive material to inhibit the generation of eddy currents which will oppose the relative motion. This may be done, for example, by embedding a powdered magnetic substance in a nonconductive binder or by using a metallic ceramic such as ferrite.

Surrounding the magnets 11 and 12, respectively, and somewhat spaced therefrom are two permanent magnets or magnet elements 15 and 16 which are mounted on a rigid support 17. In the illustrated embodiment of the invention, the magnets 15 and 16 are annular in form but, if desired, each may comprise a plurality of parallel bar magnets arranged in circular fashion. The magnets 15 and 16, which may also be made of electrically substantially nonconductive material, such as a permanently magnetized ferrite or Indox, for example, if rotation of the member 10 is desired, have the same axial length as the corresponding magnet elements 11 and 12 and are oriented with magnetic poles disposed at opposite ends which are of the same polarity as the adjacent poles of the members 11 and 12. Preferably, the magnets 11 and 12 are each axially centered with respect to the magnets 15 and 16. While so positioned, the interacting magnetic fields from the adjacent poles of like polarity create a repulsive force to maintain the magnets 11 and 12 coaxial with the magnets 15 and 16 and provide good lateral stability for the member 10. However, while the force in the axial direction is zero for this position, it is also the position of maximum axial instability in that as soon as either of the magnets 11 and 12 is displaced axially from this position, it experiences a repulsive axial force in the direction of the displacement and increasing with the displacement.

In order to provide axial stability for the member 10, there are mounted on the support 17 beyond the outer ends of the magnets 15 and 16 two induction coils 18 and 19 which are energized from an oscillator 20 and an amplifier 21, the axes of the coils being aligned with the axis of the permanent magnets 15 and 16. These coils operate to apply to the member 10 and associated elements axial forces opposite in direction and greater in magnitude than the above-described forces tending to displace the member 10 axially from its initial position. This is accomplished by controlling the currents fed to the coils 18 and 19 so as to produce a controllable electromagnetic field at each coil which serves to attract associated cylinder blocks or magnet elements 22 and 23 of magnetic material which are attached to the ends of the magnets 11 and 12 by shafts 24 and 25 of nonmagnetic material. With the magnet elements or blocks 22 and 23 located just outside the coils, as shown in FIG 1, the electromagnetic fields of the coils not only produce electromagnetic forces acting on the two blocks 22 and 23 which are substantially equal and also in opposite directions to provide an axial centering force but also contribute to the lateral or angular restoring force because of the shape of the magnetic field at that point.

Any suitable position detecting device may be utilized to detect the axial location of the member 10 and thereby control the magnitudes of the restoring forces applied by the coils 18 and 19 to the blocks 22 and 23. In the illustrated embodiment, this is accomplished by a photoelectric detector comprising a conical element 26 mounted at the outer end of the block 22 which intercepts a collimated beam of light 27 passing through two slits 28 and 29 from a light source 30 to a photocell 31. Accordingly, variations in the axial location of the member 10 generate corresponding changes in the photocell output signal, but this signal is not affected by changes in the lateral position of the member. The photocell output signal is applied to an amplifier 21 in such manner that changes in the output signal produce corresponding changes in opposite directions in the current supplied to the coils 18 and 19, thereby increasing the attractive force of one coil and decreasing that of the other coil from the force which is normally obtained when the member 10 is centered and the cone 26 is, for example, at a mid position with respect to the light beam 27.

If desired, the member 10 may include appropriately arranged magnetic core elements and be surrounded by suitable field coil elements (not shown in FIG. 1) of the type described below with respect to FIG. 6, to impart rotation about the axis of the suspended assembly. Moreover, to decrease the frictional resistance of the atmosphere to higher rotational speeds, the entire system or at least the member 10 and the components mechanically connected thereto may be enclosed in an evacuated casing.

In a representative magnetic suspension arrangement, according to FIG. 1, the magnets 11 and 12 may have a length of 0.5 inch, a diameter of 0.5 inch and a field strength of about 500 gauss, while the magnets 15 and 16 may have a length of 0.5 inch and an inside diameter of 0.55 inch, along with a field strength of about 500 gauss. With an oscillator 20 generating current at 4400 cycles per second, for example, each of the coils 18 and 19 may be 1.4 inches long and 0.5 inch inside diameter, and may consist of about 1200 turns of wire. An adjacent axial restoring force is then obtained if the blocks 22 and 23 are made of the nonconducting magnetic material known as ferrite and are 1.4 inches long and 0.5 inch in diameter and are located 0.05 inch from the end of the adjacent coil, provided the position detecting system and the amplifier 21 produce a 100 percent change in the field strength for each 0.001 inch displacement of the member 10 from its normal location within the operating region.

Figure 5A:
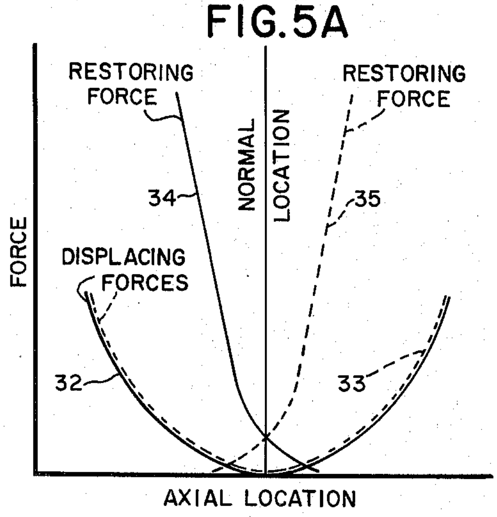
FIGS. 5A and 5B are graphical representations of the forces provided by the magnet elements of FIGS. 1 and 2 which are useful in illustrating the operation of the invention.
Figure 5B:
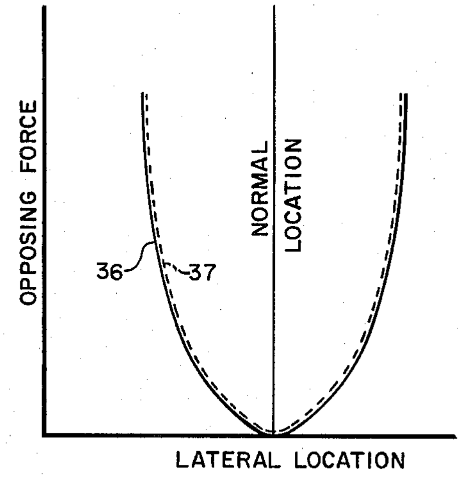

In operation, the adjacent like poles of the magnets 15 and 11, and 16 and 12 maintain the member 10 coaxial with the magnets 15 and 16 without any mechanical contact between magnets 11 and 15 or 12 and 16 and provide good lateral stability. This is illustrated in FIG. 5B wherein the magnitudes of the forces produced by the magnets 15 and 16 which oppose lateral displacement of the member 10 are represented by the lines 36 and 37 and these increase with increasing lateral displacement of the member 10 from the position shown in FIG. 1. FIG. 5A illustrates how the magnitudes of the magnetic forces acting on the member 10 vary as it is displaced axially. It will be noted that the forces exerted by the magnets 15 and 16, which urge the member 10 away from its normal axial position and are represented by the lines 32 and 33, increase with increasing displacement of the member from that position. Hence, in the absence of any axial restoring means, the member 10 would not be retained in its normal axial location in the presence of applied axial force. To hold the member 10 in an axially stable condition, the induction coil 18, controlled by the amplifier 21 in accordance with the position of the member 10 as indicated by the photocell 31, generates a magnetic field of sharply increasing strength to attract the block 22 with increasing force as the member moves to the left, as represented by the line 34 in FIG. 5A. Similarly, the field of the coil 19 attracts the block 23 with sharply increasing strength as the member moves to the right, as indicated by the dash line 35, and these restoring forces are at all times considerably greater than the axial displacing forces generated by the magnets 15 and 16. Accordingly, the coils 18 and 19 and the associated control system effectively provide a stable suspension of the member 10 in the axial direction. Therefore, it will be apparent that this embodiment of the invention is fully effective to suspend an object freely even under the application of substantial forces applied in any direction tending to displace the member from its normal position.

Figure 2:
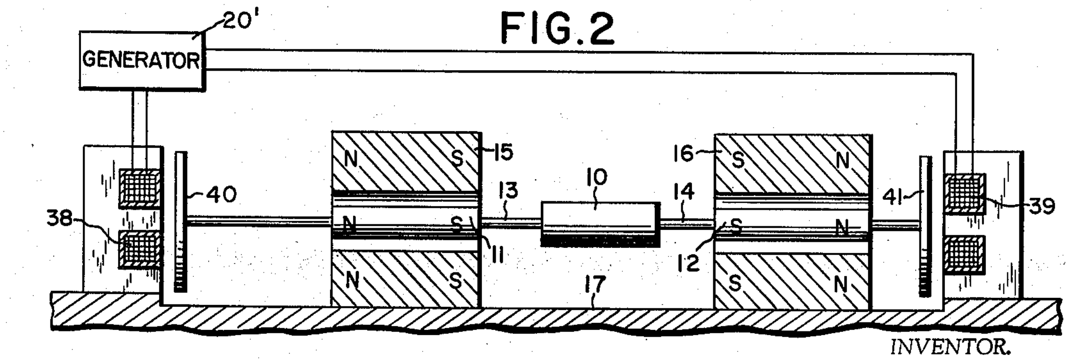
FIG. 2 is a similar view showing another form of magnetic suspension system according to the invention.

The embodiment of the invention shown in FIG. 2 is somewhat similar to that of FIG. 1 in that it includes a member 10 suspended in the lateral direction by two permanent magnets 11 and 12 which are surrounded by two further permanent magnets 15 and 16, the magnets 15 and 16 being aligned with the magnets 11 and 12 in the axial direction as in FIG. 1. In FIG. 2, however, the axial restoring force is produced by an inductive type of repulsion system rather than an attraction system of the electromagnetic type as in FIG. 1. Two electromagnetic coils or elements 38 and 39 are wound upon E-shaped iron cores, i.e. cores of E-shaped cross section, and are located at opposite ends of the system. The coils 38 and 39 are coupled to an A.C. generator 20' and the alternating electromagnetic fields generated by the electromagnets 38 and 39 induce eddy currents in the associated discs 40 and 41 which are made of a conductive nonmagnetic material such as aluminum or copper and are attached perpendicularly to the ends of the suspended assembly. These eddy currents in members 40 and 41 produce electromagnetic fields which are opposite in polarity to the electromagnetic fields generated by the coils 38, 39 and thus repulsion forces are generated on each end of the system. These repulsion forces are opposite in direction and thus serve to maintain the system axially centered. Should the member 10 tend to move axially toward one end, the repulsive forces at said one end increase while the repulsive forces at the other end decrease, and thus the electromagnetic forces act to return the system to its centered position. Preferably, with the dimensions of the other elements similar to those given above with respect to FIG. 1, the discs 40 and 41 are approximately 0.25 inch thick and 3 inches in diameter and are made of Dural and the coils 38 and 39 are normally spaced from the discs by about 1/16 inch. It is important that these discs be substantially greater in diameter than the outside diameter of the coils to avoid "edge" effects.

In describing the operation of the embodiment of FIG. 2, the line 34 of FIG. 5A may be considered as representing the repulsive force created between the disc 40 and the coil 38 as the member 10 is displaced to the left in the axial direction while the line 35 indicates the repulsive force generated between the disc 41 and the coil 39 upon motion to the right.

Figure 3:
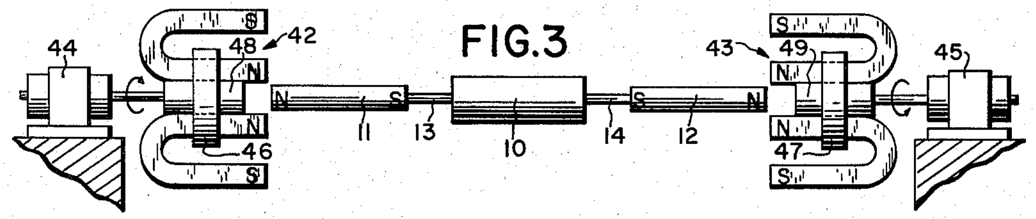
FIGS. 3 and 4 illustrate two further arrangements embodying the magnetic suspension system of the invention.

FIG. 3 shows a further form of the invention intended for use under conditions in which relatively low displacing forces are expected and momentary physical contact of the suspended object under excessive displacing forces may be permissible. In this arrangement, the member 10, affixed to the axially aligned opposed magnets 11 and 12, is freely suspended as the result of the repulsive forces applied by two groups of horseshoe-type magnets 42 and 43 rotated in opposite directions by corresponding drive motors 44 and 45. Each of the magnets in the group 42 and 43 is affixed with like poles adjacent to the magnets 11 and 12 by bands 46 and 47 to central drive shafts 48 and 49 which have slightly greater diameter than the magnets 11 and 12 so that the magnetic repulsion forces acting on the element 10 are directed inwardly toward the axis of the suspended assembly as well as in opposite axial directions. Although two magnets are illustrated in FIG. 3 in each of the groups 42 and 43, it will be understood that there may be a single magnet in each group, but with only one magnet the rotational speeds of the motors 44 and 45 necessary to maintain the member 10 in a stable condition will be increased.

In operation, the assembly 10. 11, 12, which is to be suspended, is held in axial alignment with the magnet groups 42 and 43, and the motors 44 and 45 are energized to rotate these groups, preferably in opposite directions, as shown in the drawing. When the rotational speed of the motors is high enough to produce sufficient centering forces in all lateral directions, the member 10 can be released and will remain suspended. Referring to FIG. 5A, the available magnetic repulsion force between the magnet groups 42 and 43 and the associated magnet member 11 and 12 opposing axial displacement of the member is similar to that represented by the curves 34 and 35.

Figure 4:
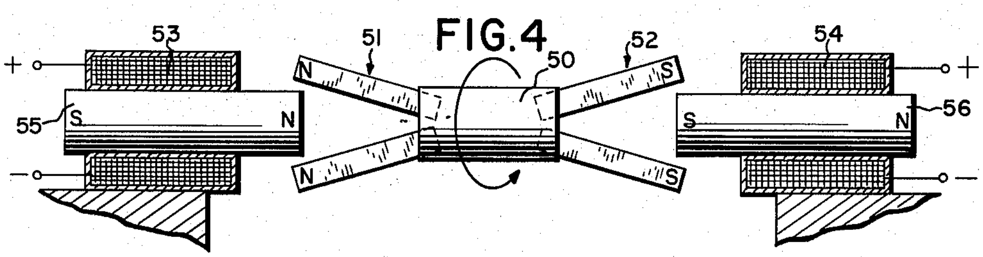

Similarly, the arrangement shown in FIG. 4 provides free suspension under conditions in which relatively low displacing forces are encountered and does not require any position detecting arrangement. The suspended member 50 of this system has two groups 51 and 52 of bar magnets or magnet elements at opposite ends (two such magnets being shown in the drawing at each end) wherein each magnet extends outwardly at an angle of about 30° to the axis of the member and the polarities at the outer ends of all magnets in each group are identical. Two electromagnets 53 and 54, mounted at opposite ends of the suspended assembly, have corresponding magnetic core members 55 and 56 which project between the outer ends of the magnets in the adjacent groups 51 and 52, and these magnets are energized to produce magnetic polarities at the inner ends which are the same as those in the adjacent ends of the magnets in the groups 51 and 52. If desired, the inner ends of the cores 55 and 56 may be conically shaped so as to more nearly conform to the opening within the magnets 51 and 52. Also, if desired, only a single magnet may be provided in each of the groups 51 and 52 but this arrangement, of course, will require a higher rotational speed to maintain stability.

In operation, the member 50 is inserted between the core elements 55 and 56 and held in position and the coils 53 and 54 are energized with direct current applied in the appropriate manner to produce the indicated polarities. Thereafter, a rotational force is applied to the member 50 by any suitable means until the rotational speed is great enough to suspend the member. It will be readily apparent that the restoring force for this system is also similar to the curves 34 and 35 of FIG. 5A. Although no position detecting and control system is shown in FIG. 3, a system like that of FIG. 1 may be utilized to detect the axial location of the member 50 and control the energization of the electromagnets 53 and 54 accordingly. Moreover, if no detecting system is required and the expected displacing forces acting on the member 50 are small, the electromagnets 53 and 54 may be replaced by bar type permanent magnets.

Figure 6:
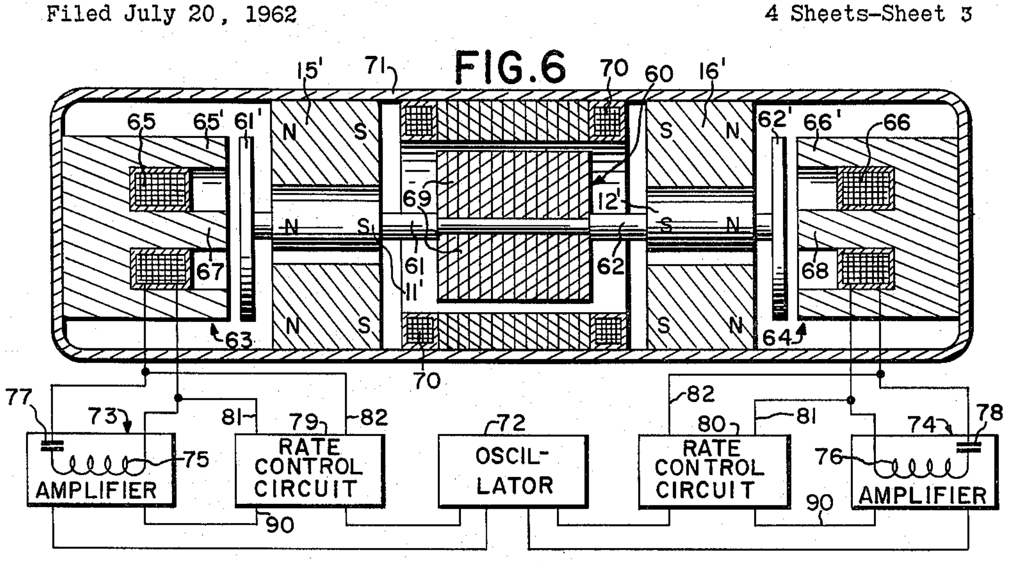
FIG. 6 is a partly schematic sectional view showing a further suspension system according to the invention.
Figure 7:
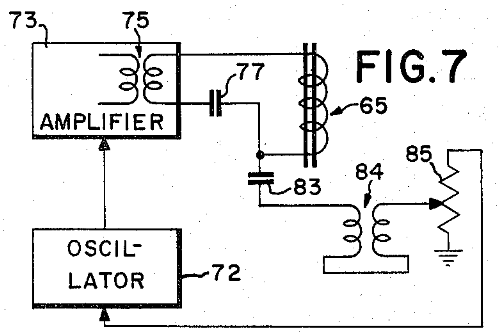
FIG. 7 is an electrical circuit diagram illustrating the arrangement of the rate control circuits shown in block form in FIG. 6.

In FIGS. 6 and 7 there is illustrated an embodiment of the invention which is particularly adapted for use in devices which may be subjected to high accelerative forces and wherein very high rotational speeds are desired, such, for example, as a gyroscope. In this case, an electromagnetic system is utilized comprising member 60 which is to be suspended and which carries two axially disposed shafts 61 and 62 and associated discs 61' and 62' of soft magnetic electrically nonconductive material such as ferrite, one mounted at each end. Two electromagnets or magnet elements 63 and 64 having windings 65 and 66, respectively, are mounted in fixed position at opposite ends of the member 60 with their central core portions 67 and 68 axially in line with the shafts 61 and 62. The core structure of each electromagnet 63, 64 is preferably cylindrical shaped with an E-shaped longitudinal cross-section, and the outer diameter of the core structures being the same as the diameter of the discs 61', 62'. In the centered position, small air gaps exist between the discs 61', 62' and the center core portions or poles 67, 68 and the otuer core or pole structures 65', 66'. Permanent magnet assemblies 11', 15' and 12', 16' similar to those shown in FIG. 1 are utilized to provide lateral stability as explained above.

To impart rotation to the suspended assembly 60, 61 and 62, the member 60 is made with core segments 69 of magnetic material at a plurality of angularly spaced locations and is surrounded by field coils 70 having pole pieces appropriately positioned so that a multiple phase alternating current applied to the field coils exerts an angular force on the mmeber 60 about ts axis but no appreciable lateral force. The entire assembly is mounted within a rigid container 71 which may be evacuated to reduce air friction and, as a result, the coil 70 may be relatively small and light in weight since substantially no torque is required to maintain rotation of the member 60 after it has been accelerated to a desired angular speed.

Normally, the magnetic force between the disc 62′ and electromagnet 64 would increase as the gap between 62′ and 68 decreased and, at the same time, the force between magnet 63 and disc 61′ would decrease, and thus this system would be completely unstable. For stability, it is necessary that the result noted above be reversed, i.e. as the disc 62′ moves closer to the electromagnet 64 the magnetic force decreases and the magnetic force on the opposite end increases to pull the system back to the centered position.

In order to control the energization of the electromagnets 63 and 64 in accordance with the position of the suspended assembly to accomplish the above result, the oscillator 72 supplies current at a fixed frequency, for example, about 4400 c.p.s. to two amplifiers 73 and 74, each containing a winding 75, 76 and a capacitor 77, 78 connected in series with the electromagnet windings 65 and 66, respectively. These components are selected so that each of the energizing circuits 65, 75, 77 and 66, 76, 78 forms a sharply tuned resonant circuit, the circuit being tunable to produce rapid changes in the amplitude of the current through the respective coils 65 or 66 by changing the gap spacing between the discs 61′ or 62′ and the electromagnet core structure, thus changing the inductance of the resonant circuit. The resonant circuit of the electromagnet 64 is first adjusted for maximum resonance, i.e. peak amplitude current, with the disc 62′ spaced a slightly greater distance away from the core than when the system is longitudinally centered. Such adjustment may be made by controlling the value of the capacitance of condenser 78, for example. Then, when member 60 is longitudinally centered, the slight decrease in the gap spacing causes the resonant circuit to be tuned off the peak point and onto the sharp slope of the resonance curve. Thereafter, as the disc 62′ moves toward the electromagnet 64, the resonant circuit is further detuned so that the operating point moves down the resonance curve or slope and the current through the electromagnet decreases sharply, thus reducing the electromagnet field strength and thus the attraction force on the disc 62′. The opposite end of this system is arranged and initially tuned in the very same manner so that, as the disc 61′ moves away from the electromagnet 65, the operating point for the resonant circuit of electromagnet 65 moves up the slope of its resonance curve, i.e. the current through the electromagnet 65 sharply increases, thus increasing the electromagnetic field and the attraction force on the disc 61′.

It can be seen, therefore, that as the system moves toward magnet 64 and away from magnet 63, the magnetic attraction force of magnet 64 actually decreases sharply while that of magnet 63 increases sharply, and the magnetic force of magnet 63 pulls the system back to the center or stable position. Should the system tend to move in the other direction, i.e. to the left as seen in FIG. 6, the decrease in the gap spacing at magnet 63 causes operation on a lower point on the resonance curve, thus decreasing the current in magnet 63, while the increase in gap spacing at magnet 64 causes an increase in the current in that electromagnet. The magnetic force at magnet 63 thus decreases and that at magnet 64 increases, returning the system to the center or stable position.

In order to prevent hunting, i.e. mechanical oscillations, a suitable servo system may be utilized. In FIG. 6, rate circuits 79 and 80 are shown in series with the oscillator circuit 72 in each half of the system and these rate circuits serve to couple a portion of the output of the amplifiers 73 and 74 via lead 81, 82 back to the input via lead 90 to serve as a rate control signal.

An example of a simple rate circuit is shown in FIG. 7. A portion of the amplifier output signal applied across condenser 77 is fed through a coupling condenser 83 and through a phase control transformer 84 to the sliding tap of a potentiometer 85 which is connected in series with the output of the oscillator 72 to the input of the amplifier 73. As is apparent to those skilled in the electronics art, many other known forms of rate circuits may be utilized in the anti-hunting system.

Figure 8A:
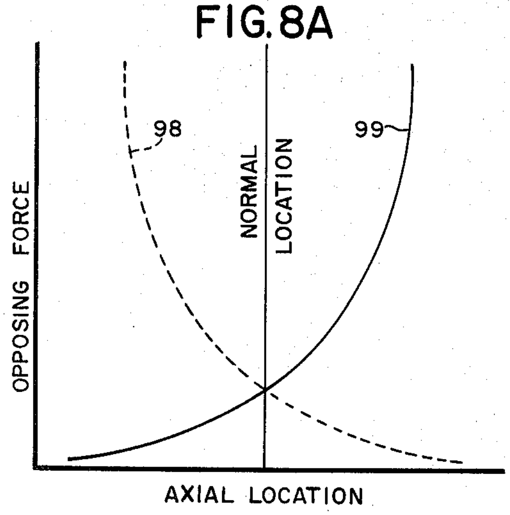
FIGS. 8A and 8B are graphical representations of the forces generated by the electromagnets of the system shown in FIGS. 6 and 7.
Figure 8B:
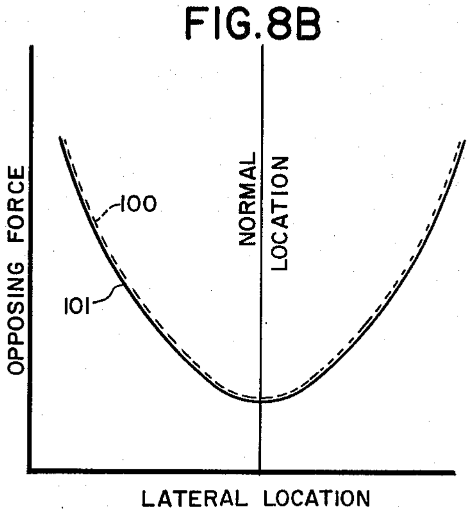

In the operation of the embodiment shown in FIG. 6, initially equal currents are supplied from the oscillator 72 through the amplifiers 73 and 74 to the windings of the electromagnets 63 and 64 to energize them so that the member 60 is suspended at an axially and laterally central location. If rotation of the member is required, as in a gyroscope, an alternating multiple phase current source which may be derived from the oscillator 72 to energize the coils 70. The effect of any displacement of the member 60 on the restoring forces produced by the electromagnets 63 and 64, after the member has been stabilized in a central position, is illustrated in FIGS. 8A and 8B, in which the curves 98 and 99 represent the axial restoring forces generated by the magnets 64 and 63, respectively, assuming a constant velocity displacement and the curves 100 and 101 illustrate the change in restoring force with lateral displacement at constant velocity. Thus, as the member 60 moves to the left from its normal position, as viewed in FIG. 6, the attractive force of the magnet 63 falls off and that of the magnet 64 increases sharply. If the velocity of displacement increases, the amplitudes of both these forces will be increased by the rate control circuits described above, but since each increase is in proportion to the amplitude value, the attractive force of the magnet 64 nevertheless predominates strongly until the member is returned to its normal location. If a force is applied to the member 60 tending to produce oscillation, the decrease in restoring force as the member is brought to a momentary stop at each end of its cycle of oscillation terminates the oscillatory motion promptly. In the same manner, the system shown in FIG. 6 is effective to increase the attractive forces of both magnets tending to restore the member to an axial location in response to lateral or angular displacement, as shown in FIG. 8B and, in this case, the rate control circuits 79 and 80 are similarly effective not only to increase the restoring force with increasing velocity of displacement but also to prevent oscillation or hunting.

In one application of the system shown in FIG. 6, the entire assembly including the casing 71 may be supported in gimbals (not shown) for use as either a single axis gyroscope or a free gyroscope since the electromagnets 63 and 64 maintain the casing parallel with the member 60 at all times. Moreover, by detecting the difference in voltage across opposite pairs of coils and the voltage signal in the rate circuit, variations in the restoring force applied to the member 60 by the electromagnet can be utilized to indicate a corresponding component of the forces acting on the suspended member. With similar detecting in the other displacement amplifier 74 and rate control circuit 80, the magnitude and direction of any axial component of force can be determined. These detected signal may also be used, as is well known to those skilled in the art, as error signals and fed back into amplifiers 73 and 74 to reduce static displacement or "sag" due to steady forces to any desired degree. Other uses for the various friction free magnetic suspension systems according to the intention, such as in sensitive galvanometers or other measuring instruments, will readily occur to those skilled in the art.

The mass of the member 60 and the ferrite shafts 61 and 62 and associated discs 61′, 62′ in a representative system according to FIG. 6, may be approximately 200 to 500 grams where the ferrite shafts have a diameter of 0.5 inch and a length of 2 inches and are normally spaced from the core portions 67 and 68 by gaps of 0.005 inch. In this case, the windings 65 and 66 each have 1200 turns and normally carry 1.5 amperes with an applied potential of about 11 volts. In the rate control circuits, the resistors 85 may have a total value of 300 ohms, and the capacity of the condenser 83 may be 0.05 microfarad. If the frequency of the oscillator 72 is 4400 cycles, the values of the capacitors 77 and 78 may be 0.5 microfarad and the inductances of the elements 75 and 76 are selected to provide the required resonant frequency.

Figure 9:
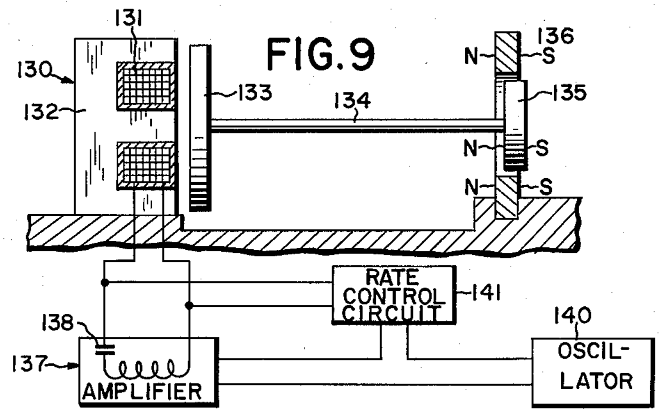
FIG. 9 illustrates still another suspension system arranged according to the invention.

Another form of magnetic suspension system is illustrated in FIG. 9, this system differing from that shown in FIG. 6 somewhat in that a permanent magnet arrangement is utilized on one end in place of the electromagnet assembly. The arrangement shown in FIG. 9 comprises an electromagnet 130 having a coil winding 131 and a core member 132 which are both preferably shaped as objects of revolution about the axis of the system. Closely adjacent to the electromagnet is a disc 133 made of a nonconducting magnetic material such as ferrite and attached to this disc by a perpendicular shaft 134 is a permanent magnet 135 in the form of a button having poles at the opposite faces thereof. Another permanent magnet 136 in the form of a ring, also magnetized with poles on opposite faces and having a slightly larger inside diameter than the diameter of the button, is mounted in fixed position surrounding the button 135. With the poles of the magnets 135 and 136 oriented in the same axial direction and with the button 135 displaced a small axial distance with respect to the ring 136 in the direction away from the electromagnet 130, a force is exerted on the suspended assembly 133, 134, 135 tending to move the assembly to the right as viewed in FIG. 9 and the magnitude of this displacing force increases with increasing displacement to the right.

In order to provide stability in the axial direction, the energization of the electromagnet 130 is controlled according to the motion of the suspended assembly as described above with reference to the electromagnet system of FIG. 6 by connecting the coil 131 in a resonant circuit with an amplifier 137 having a capacitor 138 and an inductance 131, such that the attractive force of the magnet 130 urging the suspended assembly to the left increases with increasing displacement to the right due to increased magnet current at a greater rate than does the force of the magnets 135 and 136 tending to move the assembly to the right. Consequently, as the assembly moves toward the electromagnet from its normal position, the inductance of the coil 131 increases, reducing the current through the electromagnet and the resulting attractive force to the extent that the repulsion force between the magnets 135 and 136 predominates, urging the assembly to the right. On the other hand, as the assembly is displaced to the right from its normal position, the attraction of the electromagnet is increased to a value greater than the repulsion force of the magnets 135 and 136 thereby drawing the assembly to the left. Moreover, both the electromagnet and the magnets 135 and 136 provide good lateral stability for the suspended system. In a typical system according to FIG. 9, the button 135 may be axially displaced with respect to the ring 136 by about 0.010 inch and the inside diameter of the ring may be greater than the diameter of the button by about 0.100 inch, while the disc 133 is spaced from the electromagnet by about 0.10 inch. Also, both the ring and the button may be about one quarter inch thick. If desired, several ring and button magnet pairs may be provided in spaced relation along the shaft 134 to increase the lateral stability. Also, another electromagnet 130 and disc 133 may be disposed at the opposite end of the shaft 134 as in FIG. 6 to control the axial position and the ring and button may be aligned axially to provide lateral stability only.

Figure 10:
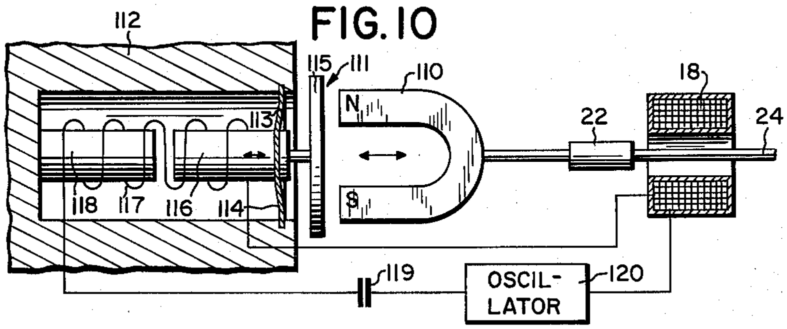
FIG. 10 is a fragmentary view illustrating another form of rate control according to the invention.

If desired, other arrangements for detecting the rate of motion of the suspended member may be used in place of the rate circuit 141 shown in FIG. 9, for example, or they may be substituted for the position detecting system shown in FIG. 1. One alternative form of rate detecting system for use with the system of FIG. 1 is shown in FIG. 10. In this case the position detecting system illustrated in FIG. 1 is replaced by a permanent magnet 110 attached to the block 22 of magnetic material and a compliantly supported assembly 111 suspended from a fixed support 112 by leaf springs 113 and 114 so as to permit limited restrained motion in a direction parallel to the axis of the member 22. The compliantly mounted assembly 111 comprises a disc 115 made of nonmagnetic electrically conductive material extending perpendicularly from the disc on the side away from the magnet.

Because of the resistance of the springs 113 and 114 to motion of the assembly 111, the displacement of the compliant assembly is in proportion to any displacing force and, in order to detect changes in the position of the assembly a coil 117 surrounds the bar 116 as well as a fixed bar 118 of magnetic material. This coil is connected in series with a capacitor 119 and the induction coil 18 to an oscillator 120 which operates at a fixed frequency. The capacitor 119 and coil 18 form a sharply tuned resonant circuit and, with the assembly in the centered or normal position, the resonant circuit values are selected so that the resonance system is operating on the steep slope of the resonance curve.

In operation, displacement of the member 22 away from its normal position to the left as viewed in FIG. 10, induces eddy currents in the disc 115 and gives rise to magnetic fields which oppose those of the magnet 110, thereby driving the assembly 111 to the left. Inasmuch as the magnitude of the induced magnetic fields is proportional to the velocity of motion of the suspended member, the resulting repulsive force displaces the assembly 111 to the left in proportion to this velocity. The resulting motion of the bar 116 into the coil 117 increases the inductance of the coil and thereby moves the operation of the circuit up the slope of the resonance curve to a value closer to the peak resonance of the circuit. This increases the current through the circuit and the coil 18 so as to raise the force attracting the block 22 to the right but, by reason of the rate-responsive arrangement, any oscillation of the suspended system is quickly damped out. Preferably, the system also includes another identical rate control system attached to the block 23 at the opposite end of the suspended assembly similar to FIG. 1 to control the energization of the coil 19.

Figure 11:
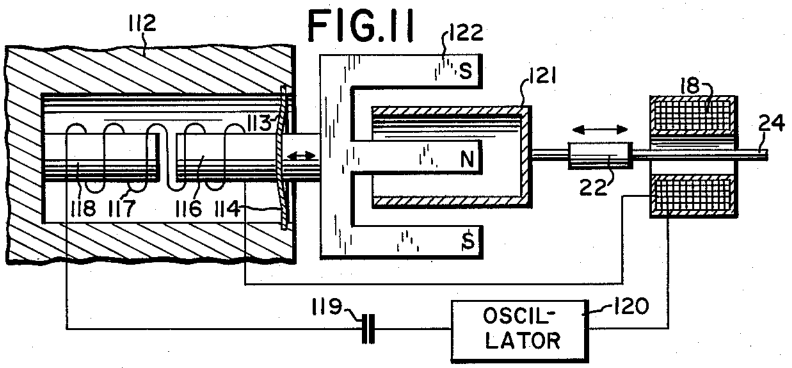
FIG. 11 shows a further rate control device according to the invention.

The rate control arrangement shown in FIG. 11 is similar to that of FIG. 10 in both structure and operation except that the magnet 110 is replaced by a hollow cylinder 121 of conductive nonmagnetic material which is open at one end and the disc 115 is replaced by a permanent magnet 122 having opposed poles disposed on opposite sides of the wall of the cylinder 121.

Figure 12:
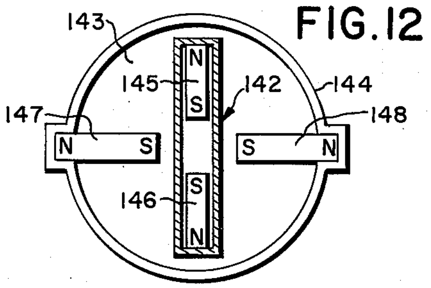
FIG. 12 shows a form of the invention adapted to provide magnetic suspension in only two dimensions.

It should be readily apparent that the magnetic suspension system of the present invention is not limited to three-axis suspension and may be applied to devices wherein suspension along one of the axes is accomplished in a different manner. In the plan view shown in FIG. 12, for example, magnetic suspension in two axes is provided for a member 142 which is floated on a liquid 143 in a container 144. To this end, the member 142 includes two magnets 145 and 146 having like poles disposed in axially spaced relation and two further magnets 147 and 148 are affixed to the container so that the corresponding poles of these magnets are held in spaced relation along an axis transverse to the center of the member 142 and parallel to the surface of the liquid 143.

Figure 14:
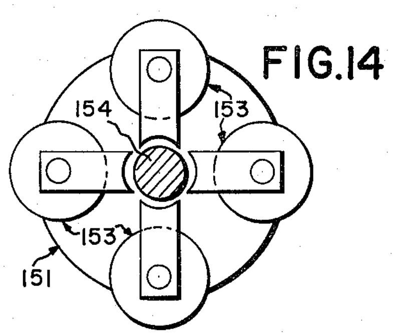
FIGS. 13 and 14 show another embodiment of the present invention.
Figure 13:
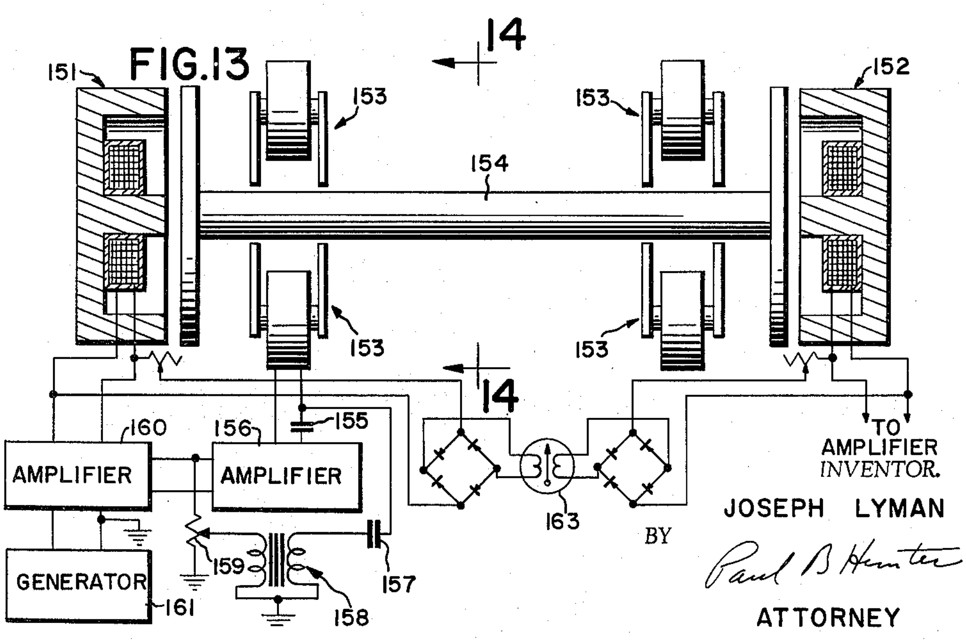

Referring now to FIGS. 13 and 14 there is shown an embodiment of the present invention wherein lateral and axial stability of a magnetic shaft is accomplished by a plurality of resonance circuit type of electromagnetic devices of the above described form shown in FIGS. 6 and 9. The two end electromagnet devices 151 and 152 are similar to the devices 63 and 64 of FIG. 6. In addition, there are eight electromagnets 153 encircling the ferrite shaft 154. The coils of each of these electromagnets form the inductive element of a resonance circuit in the same manner as the coils of units 151 and 152, the circuits being tuned such that with the shaft laterally centered within the eight units 153, each resonance circuit is operating on the slope of the resonance curve as explained above. Radial movement of the shaft toward one unit 153 and away from the opposite unit 153 will cause the current flowing through the coil of said one unit to decrease and the current in the coil of said opposite unit to increase, to thereby create a resultant magnetic force tending to return the shaft 154 to the centered position. One of the resonance circuits is shown coupled to its associated electromagnet unit, said circuit including the magnet coil, resonance condenser 155, amplifier 156, feedback condenser 157, phasing circuit 158, feedback amplitude control 159, isolation amplifier 160 and A.C. generator or oscillator 161.

If there is an acceleration along the rotor axis, due to gravity, for example, or due to gyroscopic forces when the rotor 154 is spinning, a meter 163 connected as shown in the drawings will deflect to give a precise measure of these forces. Because there is no "sticky friction" the signal has exceptional freedom from noise. Instead of the meter the signal may be fed back into coils 151 and 152 through amplifier 156 to correct steady state errors, or it may be applied to servo motor in the same manner when the device is used as a gyroscope.

Although the invention has been described herein with reference to specific embodiments, many modifications and variations therein will readily occur to those skilled in the art. For example, if desired, many of the various permanent magnets shown herein may be replaced by electromagnets and in applications not requiring variations in the magnetic field strength, the electromagnets shown in FIG. 4 may be replaced by permanent magnets. Furthermore, the resonant control circuits of FIG. 6 might be replaced by bridge type control circuits or by magnetic amplifiers, for example, without departing from the spirit of the invention. Accordingly, all such variations and modifications are included within the intended scope of the invention, as defined by the following claims.

What is claimed is:

1. A magnetic suspension system comprising, a movable shaft member to be suspended in a desired stable position, said shaft member being responsive to magnetic forces, a first variable intensity electromagnet disposed adjacent one end of said member so as to cooperate therewith to generate a magnetic force tending to urge the member in one direction along its longitudinal axis, a second variable intensity electromagnet disposed adjacent to the other end of said shaft member so as to cooperate therewith to generate a magnetic force tending to urge said member in the opposite direction along said axis, said first and second electromagnets normally retaining said member in its desired longitudinally stable position, control circuits connected to said first and second electromagnets for controlling the intensities of said electromagnets and acting to increase the force generated by said second electromagnet sharply should the member commence to move in said one direction while sharply decreasing the force generated by said first electromagnet, each of said control circuits comprising amplifier means, said amplifier means being connected for energizing a respective electromagnet, each of said electromagnets and its connected amplifier means forming a tuned circuit, whereby in the stable position of said member, each electromagnet is energized at a frequency corresponding to a point on the slope of the resonance curve of its tuned circuit, movement of said member away from said stable position causing the current in one electromagnet to move rapidly up its resonance curve and that of the other to move rapidly down, thereby acting to forcibly return said member to its longitudinally stable position, additional electromagnets positioned on opposite sides of said shaft member and acting on said member so as to retain the same in a substantially stable position along its transverse axis extending at right angles to its longitudinal axis, and control circuits including amplifier means connected to said additional electromagnets, each electromagnet and its connected amplifier means forming a tuned circuit such that in the stable position of said member along said transverse axis each additional electromagnet is energized at a frequency corresponding to a point on the slope of the resonance curve of its respective tuned circuit, whereby transverse movement of said shaft member away from its stable position on its transverse axis acts to sharply increase the current in one electromagnet and decrease the current in the other to return said member to its transversely stable position.

2. A magnetic suspension as defined in claim 1 wherein said shaft member is rotatable and has magnetic disc members on its ends, one of said disc members coacting with said first variable electromagnet and the other coacting with said second variable electromagnet, said additional electromagnets comprising two sets of four electromagnets spaced longitudinally along said shaft member and disposed around said shaft member for maintaining the latter in its stable transverse position centered within said sets of electromagnets, radial movement of the shaft member toward an electromagnet of one of said sets causing the current through such electromagnet to fall off rapidly along its resonance curve while causing the current through the opposite electromagnet to rise rapidly along its resonance curve to recenter said shaft member.

3. A magnetic suspension as defined in claim 1 wherein rate taking circuits comprising coupling condensors and phasing circuits are connected to said resonant circuits and to the input of said amplifiers, whereby changes in current in said resonant circuits are anticipated and enhanced by the action of said rate taking circuits to prevent oscillation of said shaft member.

References Cited by the Examiner

UNITED STATES PATENTS

| | | | |
|---|---|---|---|
| 3,112,962 | 12/1963 | Lautzenhiser -------- | 308—10 |
| 3,146,038 | 8/1964 | Lautzenhiser -------- | 308—10 |
| 3,155,437 | 11/1964 | Kinsey et al. -------- | 308—10 |
| 3,184,271 | 5/1965 | Gilinson ------------ | 308—10 |

ORIS L. RADER, *Primary Examiner.*

JOHN F. BEIRUS, *Examiner.*

G. HARRIS, J. J. SWARTZ, *Assistant Examiners.*